United States Patent [19]

Schwestka

[11] 3,791,635
[45] Feb. 12, 1974

[54] DETECTION OF RADIANT ENERGY EMITTING FROM A MOVING WEB OF METAL

[75] Inventor: Crayton H. Schwestka, Michigan City, Ind.

[73] Assignee: National Steel Corporation, Pittsburgh, Pa.

[22] Filed: May 22, 1972

[21] Appl. No.: 255,265

[52] U.S. Cl........... 266/3 R, 73/355 EM, 236/15 B, 432/49
[51] Int. Cl............................. C21d 9/56, G01j 5/00
[58] Field of Search 73/355 EM; 236/15 B; 266/5 E, 266/5 T, 3 R; 432/49

[56] References Cited
UNITED STATES PATENTS

| | | |
|---|---|---|
| 3,559,726 | 2/1971 | Menasoff.................. 73/355 EM X |
| 3,653,263 | 4/1972 | Poole et al..................... 73/355 R X |
| 2,690,078 | 9/1954 | Phillips .......................... 73/355 EM |
| 3,314,293 | 4/1967 | Schraeder..................... 73/355 EM |
| 3,552,645 | 1/1971 | Boyd................................ 236/15 B |
| 3,630,085 | 12/1971 | Roney et al.................... 73/355 EM |

*Primary Examiner*—Donald O. Woodiel
*Assistant Examiner*—Frederick Shoon
*Attorney, Agent, or Firm*—Shanley & O'Neil

[57] ABSTRACT

A metal web treating line includes rolls defining a travel path and a radiation pyrometer aimed at the travel path and into the wedge shaped space formed by the relationship of a roll and the travel path. Such aiming eliminates errors produced by changes in emissivity and extraneous radiation thereby providing reliable temperature measurements suitable for process control.

11 Claims, 3 Drawing Figures

DETECTION OF RADIANT ENERGY EMITTING FROM A MOVING WEB OF METAL

BACKGROUND OF THE INVENTION

This invention pertains to metallurgical apparatus and in particular to a continuous line where one or more rolls defines a travel path for a moving web of metal in heated condition and the temperature of the web is continuously measured using a radiation energy detector in the form of a radiation pyrometer.

A continuous galvanizing line is one type of such apparatus. In this type of line, steel strip is passed through an annealing furnace, then to a galvanizing pot, and then to a cooling tower. Radiation pyrometers are located throughout the system to sense the strip temperature and controllers responsive to the pyrometers are used to control the temperature of the strip. Heretofore the pyrometers have been aimed normal to the pass line, i.e., path of travel of the strip. An emissivity setting was chosen based on experience which provided the most accurate temperature readings for the types of strip run most often, namely 0.5. This setting was maintained no matter what type of strip was run inasmuch as it is not practical to change the setting for a particular type of strip. No compensation was made for extraneous radiation emanating from nearby heated members such as incandescent lamps, heating units, hot furnace walls or the like which were reflected by the moving strip into the pyrometer. As a result, the temperatures were not only inaccurate but also could not be converted to an accurate figure using an experience factor; in other words, the pyrometer readings might change because of a change in the surface characteristics of the strip or because of a change in extraneous radiation despite the fact that the temperature of the strip remained constant. With such a system a temperature reading might be off as much as 100°F. at any particular moment. With such lack of reliability uncorrectable by an experience factor, the pyrometer readings which were used for process control were not always suitable for this purpose.

Accordingly a need exists to eliminate the effects of emissivity and extraneous radiations in sensing the temperature of a moving metal web using a radiation pyrometer so as to permit more effective control over web processing and a main object of the invention is the fulfillment of this need with components normally used in the system. Other objects of the invention will appear from the following detailed description.

BRIEF DESCRIPTION OF THE DRAWING

In describing preferred embodiments of the invention reference is made hereinafter to the accompanying drawings in which.

DESCRIPTION OF THE PREFERRED EMBODIMENT

Figure 1:
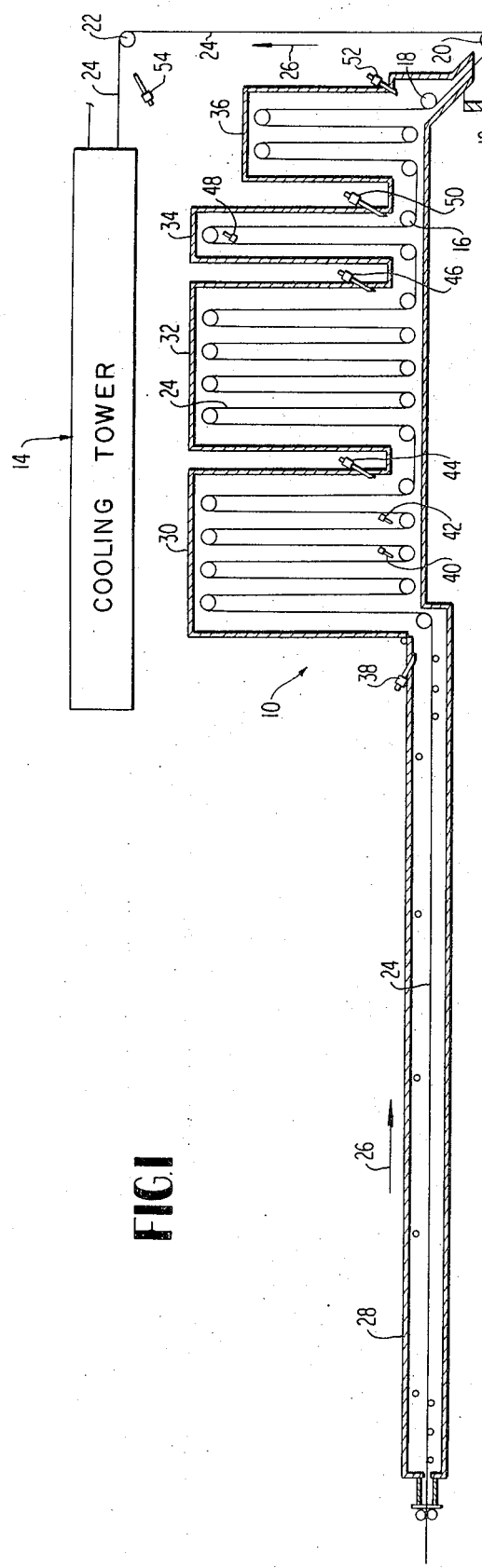
FIG. 1 is a side cross-sectional view of a continuous galvanizing line embodying principles of the invention.

In FIG. 1, a steel strip is conducted through a continuous annealing furnace 10, then to a galvanizing pot 12, and then to a cooling tower 14. The strip is conducted by a plurality of rollers as at 16, 18, 20 and 22. The rollers guide the strip along a pass line (the terms "pass line" and "travel path" are used synonomously herein) 24 in the direction of arrows 26. Furnace 10 has a plurality of heat treating zones generally indicated at 28, 30, 32, 34 and 36 respectively, in which the strip is successively heated, furtehr heated, slow-cooled, fast-cooled and soaked (that is held). In a typical annealing cycle, strip is heated to 1,200°F. in zone 28, further heated to 1,400°F. in zone 30 and held for at least 25 seconds, slow-cooled to 1,200°F. in at least 60 seconds in zone 32, then rapidly cooled to 900°F. in zone 34 and held for at least 20 seconds in zone 36.

A plurality of radiant energy detectors in the form of radiation pyrometers are located along the pass line. The radiation pyrometers are indicated at 38, 40, 42, 44, 46, 48, 50, 52, and 54. Each pyrometer focuses on the strip and senses the temperature of the strip at the location of the pyrometer. Controllers are responsive to each pyrometer to control the temperature of the strip in the location of the pyrometer if such temperature deviates from standards. For example, the output of a controller functions to turn on or off an electric heater, open or close a damper therefore increasing or decreasing a supply of circulating cooling gas, or increase or decrease a gaseous fuel supply, depending on where in the galvanizing line the temperature is being controlled. The invention herein resides in the particular way of aiming the radiation pyrometers so that the temperature readings will not be affected by emissivity or reflected extraneous radiations so that the temperature readings are more accurate and more useful for control purposes. Though there are known methods for such compensation, a particular advantage of the inventive system resides in the fact that no additional equipment over that previously used is necessary.

Figure 2:
FIG. 2 is a side view partly in section depicting a portion of the annealing section of the galvanizing line of FIG. 1 and particularly illustrates the invention.

The invention will now be described as it applies to pyrometer 52 sensing on the strip just prior to its passing over roll 18. FIG. 2 shows these in detail. This point in the system has been picked for description of the invention because the temperature at this point is particularly critical in that if the temperature of the strip entering the galvanizing pot is out of standards, there may be problems in achieving a properly adhering coating on the strip in galvanizing. It is noted however, that the invention herein is used with each of the radiation pyrometers depicted in the system.

As shown in FIG. 2, the radiation pyrometer 52 is conventional and commercially obtainable except that it has been modified to contain a water jacket 56 so as to minimize chances of heat from the system damaging the electronics of the pyrometer, and a ball joint 58 so that the aiming angle of pyrometer 52 can be varied. The pyrometer 52 is mounted in the wall 60 of soaking zone 36. The aiming or focusing of the pyrometer 52 is defined in terms of sight line 62 which follows the longitudinal centerline of the pyrometer. In accordance with the invention the pyrometer 52 is aimed at the pass line 24 so that it will focus on the strip following its path of travel and is particularly aimed into the wedge shaped space formed by the relationship of the pass line 24 and the roll 18. In particular this wedge shaped space is defined by the surface of roll 18, an imaginary plane 64 (shown as a dotted line) tangent to roll 18 at 66 and normal to the plane of the pass line 24 (that is normal to the strip following this path of travel) intersecting the plane of the pass line at 68; and the plane of the pass line 24 between intersection 68 and where the plane of the pass line is tangent to roll 18 which is denoted as 70. In other words, the wedge shaped space is defined by the lines joining 66, 68 and 70. This wedge shaped space is a black body wedge of the type described by Mendenhall in the March 1911 issue of the Astrophysical Journal at page 91, entitled "On the Emissive Power of Wedge-Shaped Cavities and Their Use in Temperature Measurement."

This feature, i.e., aiming into the aforedescribed wedge shaped portion, is responsible for elimination of emissivity effects. A further bonus is elimination of reflection of extraneous radiation into the pyrometer.

The narrower the acute angle 72 between the sight line 62 and the pass line 24 the more accurate will be the temperature reading. Preferably, this angle is less than about 40° and very preferably less than 35°. As depicted, the angle 72 is 30°. Once pyrometer 52 is installed correctly, the angle 72 need not be varied. However, the ball joint 58 is preferably included in case the workmen permanently installing the pyrometer in furnace wall 60 inadvertently install that pyrometer to sight at a different angle from that designed.

The sight line meets the plane of the pass line at target 74. The closer this target is to 70 the more accurate will be the temperature reading of the pyrometer 52. Preferably the radiation pyrometer 52 is aimed so that the target 74 is closer to 70 than to 68. As depicted target 74 is at a location in the plane of pass line 24 55 percent of the way between 68 and 70; in other words, it is closer to 70 than 68.

With respect to strip width, the location of the target is irrelevant to the results achieved as long as the sight line intersects the strip; in other words, the target may be near one edge of the strip or at the centerline of the strip or near the other edge of the strip with equal results being achieved. In practice, the pyrometer 52 is aimed at the centerline of the strip. This is because the width of the strip being run may vary for example, between 18 inches and 72 inches. Sighting at the centerline of the strip insures that the pyrometer will always be aimed at the strip regardless of the width of the strip being run.

The distance of radiation pyrometer 52 from the pass line as measured along the sight line is a function of the construction of the particular radiation pyrometer utilized. In practice, an Ircon Modline 6000 radiation pyrometer modified to include water cooling jacket 56 and ball joint 58 is utilized with the focus being 7 feet 8 inches from the target.

The size of the diameter of roll 18 has no effect on the accuracy of the temperature measurement. With very small rolls, however, it is conceivable that there will be a physical problem encountered in being able to aim any particular commercially available radiation pyrometer into a very small wedge shaped space. In practice, the diameter of roll 18 is 5½ feet.

The accuracy of pyrometer 52 is independent of strip speed.

Figure 3:
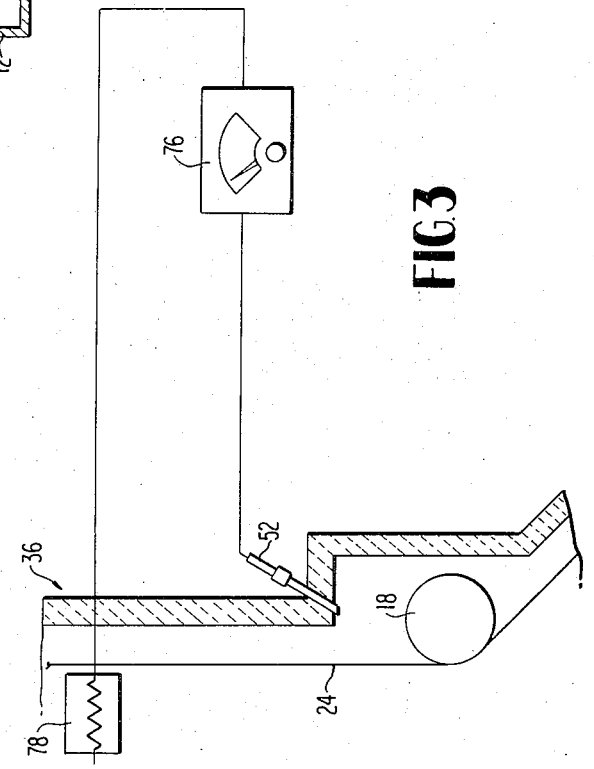
FIG. 3 schematically illustrates a method of temperature control in the portion of the annealing furnace depicted in FIG. 2.

With reference to FIG. 3, the temperature in soaking zone 36 is controlled utilizing a temperature controller 76 which is operatively connected to pyrometer 52 and which controls an electric heater 78 which is in zone 36. If the temperature sensed by pyrometer 52 is lower than that desired, the signal generated by pyrometer 52 is received by controller 76 which in response turns on electric heater 78. If the temperature sensed by pyrometer 52 is higher than that desired, temperature controller receives that signal from pyrometer 52 and in response turns off electric heater 78. As previously indicated, in other parts of the system controllers acting in response to pyrometers may, for example, operate to adjust the temperature by closing or opening a damper to adjust the flow of cooling gas or by regulating the flow of fuel into a gas fired heating zone.

In the depicted system with emissivity settings on the pyrometers of 1.0, the readings are quite accurate, i.e., to within 10° to 15° of the strip temperature. Effects of emissivity and reflected extraneous radiation are eliminated. The momentary inaccuracies of prior systems have been eliminated. As a result, the pyrometers aimed in accordance with this invention are excellent for purposes of control in the depicted galvanizing line and consistently good product is produced. Moreover, the system of the invention can be implemented utilizing components already in the system. The rolls are there and the pyrometer is there. The invention is in the aiming of the pyrometer.

In general where the roll temperature is the same as or lower than that of the strip, the temperature reading supplied by use of the present invention is quite accurate. If the roll temperature is higher than the temperature of the strip, inaccuracies may be introduced but since effects of emissivity and reflected extraneous radiations are eliminated an experience factor can be used to correct for such and the system of the invention still utilized for control purposes.

The invention may be embodied in other specific forms without departing from the spirit or essential characteristics thereof. For example, it may be used in lines other than galvanizing lines where metallic webs in heated condition are trained over rolls and it is important to measure the temperature of such web without the results being affected by changes in emissivity or reflected extranseous radiation. Though the control systems depicted are automatic, such control can be manual. Other methods of adjusting the angle of the sight line can be utilized besides the ball joint method described; for example, a method based on relative movement of plates having contacting beveled faces, can be utilized. Thus the embodiment described in detail above is to be considered in all respects as illustrative and not restrictive, the scope of the invention being indicated by the appended claims rather than by the foregoing description and all changes that come within the meaning and range of equivalency of the claims are therefore intended to be embraced therein.

I claim:

1. Apparatus for detecting the radiant energy from a moving web of metal in heated condition, comprising
    at least one roll means defining a point in a pass line for the web, which pass line is tangent to a point on the roll means,
    radiant energy detector means aimed at the plane of the pass line and into a wedge shaped space formed by the relationship of the pass line and said roll means.

2. The apparatus of claim 1 wherein the wedge shaped space is defined by a roll means, an imaginary plane tangent to the roll means and normal to the plane of the pass line, and the plane of the pass line between where the imaginary plane intersects it and where the plane of the pass line is tangent to the roll means; and wherein the detector means is aimed at the plane of the pass line at a location closer to where the plane of the pass line is tangent to the roll means than to where the imaginary plane intersects the plane of the pass line.

3. The apparatus of claim 1 wherein the aiming of the detector means is characterized by a line of sight, and the acute angle between the line of sight and the pass line is less than about 40°.

4. The apparatus of claim 3 wherein the acute angle between the line of sight and the pass line is less than 35°.

5. The apparatus of claim 3, including means to vary said acute angle.

6. Apparatus for treating a moving web of metal in heated condition, comprising
   at leat one roll means defining a point in a pass line for the web, which pass line is tangent to a point on the roll means,
   radiant energy detector means aimed at the plane of the pass line and into the wedge shaped space formed by the relationship of the pass line and said roll means,
   chamber means housing at least a portion of said pass line,
   control means responsive to said detector means to control the temperature within the chamber means.

7. Metallurgical apparatus, comprising
   chamber means having an inlet and an outlet,
   at least one roll means within said chamber means defining a point in a path of travel for heated strip moving through said chamber means from the inlet to the outlet,
   radiant energy detector means aimed at the travel path and into a wedge shaped space formed by the relationship of the travel path and said roll means,
   control means responsive to said detector means,
   heater means within said chamber responsive to said control means.

8. A method for sensing the temperature of a mvoing web of metal which is in contact with the roll using a radiation pyrometer whereby inaccuracies due to emissivity and extraneous radiation are eliminated, comprising
   aiming said radiation pyromter at the web of metal between where said web is tangent to the roll and where an imaginary plane tangent to the roll and normal to the plane of the web intersects the plane of the web.

9. The method of claim 8 wherein the radiation pyrometer is aimed along a sight line forming an acute angle with the web of less than about 40°.

10. The method of claim 9 wherein said acute angle is less than about 35°.

11. The method of claim 8 wherein the pyrometer is aimed at the web closer to where said web is tangent to the roll than to where the imaginary plane intersects the plane of the web.

* * * * *